United States Patent [19]
Banks

[11] Patent Number: 5,755,545
[45] Date of Patent: May 26, 1998

[54] SECURING MEANS FOR TEMPORARILY SECURING A COVERING

[76] Inventor: Henry Banks, Picket Hill Rd., R.R. 1, Box 298, Denmark, Me. 04022

[21] Appl. No.: 778,043

[22] Filed: Dec. 24, 1996

[51] Int. Cl.[6] .............................. F16B 15/02; F16B 43/02
[52] U.S. Cl. ................ 411/482; 411/533; 411/542; 411/923
[58] Field of Search .......................... 411/482, 480, 411/533, 542, 369, 923

[56] References Cited

U.S. PATENT DOCUMENTS

| | | | |
|---|---|---|---|
| 100,355 | 3/1870 | Baumgartner | 411/923 |
| 750,070 | 1/1904 | Stevenson | 411/480 |
| 1,335,756 | 4/1920 | Scarff | 411/923 |
| 1,705,371 | 3/1929 | Mehlman | 411/923 |
| 1,767,565 | 6/1930 | Thrift | 411/482 |
| 2,093,261 | 9/1937 | Willson | 411/923 |
| 3,750,523 | 8/1973 | Fujita | 411/923 |
| 4,712,802 | 12/1987 | Hewison | 411/542 |

*Primary Examiner*—Flemming Saether
*Attorney, Agent, or Firm*—Wolf, Greenfield & Sacks P.C.

[57] ABSTRACT

A means for temporarily securing a tarpaulin or like fabric having a series of grommeted holes about its periphery. The means comprises a double headed nail with an apron or apron frictionally engaging the nail immediately below the second or lower head.

6 Claims, 1 Drawing Sheet

SECURING MEANS FOR TEMPORARILY SECURING A COVERING

FIELD OF THE INVENTION

The present invention relates to a means for temporarily securing a cover, such as a tarpaulin, plywood boards, and plastic or metal sheeting to a substructure.

BACKGROUND OF THE INVENTION

In the building trade, there is often a need to temporarily secure a cover to a substructure. For example, after a structure has been framed, but before a roof is applied, there may be occasions in which a temporary cover must be secured to the roof frame. Such a need also arises when repairing existing structure in which an opening in the roof has been made and work must be suspended during inclement weather. Other instances involving the temporary securing of a sheet of material include the use of plywood sheets over windows for storm preparation, temporary signs and the like. In these and other instances, there is a need for a simple means for securing a cover, such as a tarpaulin or a canvas, over the opening in a manner in which the cover can be readily removed thereafter.

It is therefore an object of the present invention to provide an improved means for securing rigid or fabric covers to substructures. A further object of the present invention is to provide an improved means for removably securing a cover to a substructure.

Another object of the present invention is to provide a means by which a cover may be secured to a substructure with little likelihood of damage to the cover, particularly if it is fabric or to the securing means. One further object of this invention is to provide means for securing a cover to a substructure in which the securing means in the form of a double-headed nail assembly may be readily removed and thereafter reused.

DESCRIPTION OF THE DRAWINGS

These and other objects and advantages of the present invention will be more clearly understood when considered in conjunction with the accompanying drawings in which.

DETAILED DESCRIPTION OF PREFERRED EMBODIMENT

Figure 1:
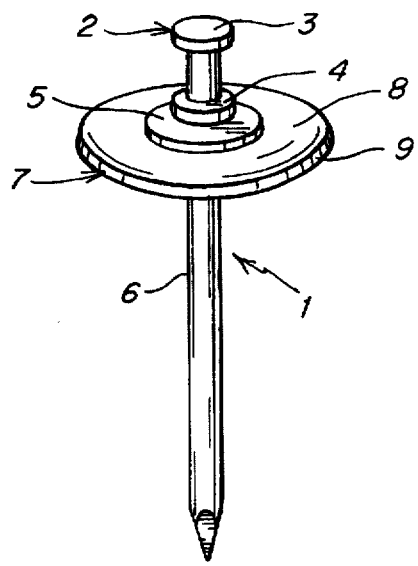
FIG. 1 is a perspective view of the securing means comprising the present invention.

The securing means illustrated in FIG. 1 consists of a nail 1 having a duplex head 2 comprising an upper head 3 and a lower head 4 integrally formed in the nail. The lower head 4 is spaced from the upper head a fractional distance of the overall length of the nail. In a typical 2½ inch nail, the heads may be spaced apart in the order of ⅛ of an inch. The heads 3 and 4 are conventionally shaped. The nail, itself, may be made of any suitable metal material generally used for such purposes.

A washer 5 is positioned immediately below and in facing contact with the lower head 4. The washer 5 is a conventional metal washer which closely fits about the shank 6 of the nail 1. A apron 7, preferably formed of molded plastic, is positioned about the shank 6. The apron 7 comprises an annular web 8 with a peripherally downwardly extending flange 9. If desired, a series of dimples 10 arranged radially on the under surface of the web 8 may be integrally formed with it. Preferably three such dimples may be arranged radially apart from one another at 120°. In addition, the apron 7 is formed on its underside with what may be best described as an annular fillet 12. This annular fillet 12 defines the opening through which the shank 6 projects. The inner surface of the fillet 12 frictionally and securely engages the surface of the shank 6 to sandwich the washer 5 between the apron 7 and lower head 4 in a preferably tight assembly. The apron 7 functions to reduce stress due to wind forces on the cover and is particularly useful when the cover is a fabric material.

The securing means illustrated in FIG. 1 are used to secure a fabric 20 to a substructure 21. The fabric 20 may comprise a conventional tarpaulin or canvas and may vary in weight per square yard and may have other qualities. It may, for example, comprise an extruded vinyl sheet or laminated arrangement of materials. Generally, these fabric coverings are intended to provide a waterproof sheet capable of insulating an opening from external weather conditions.

As is conventional in many such covers, the tarpaulin or fabric is provided with a series of openings 24 spaced apart generally along the periphery of the fabric. The number of openings 24 and their spacing depend wholly upon the particular purpose of the fabric involved. Similarly, the diameter of the opening will vary depending upon the particular purpose and weight of the fabric. In general, these openings are in the order of ¼ to ½ inch. The securing means should be sized accordingly.

The securing means illustrated in FIG. 1 is used to secure the fabric covering 20 to the substructure 21. The fabric 20 is secured to the substructure 21 by driving the shank 6 of the nail 1 through the opening in the grommet 25. The grommets 25 border and define the openings 24 in the fabric 20.

Figure 2:
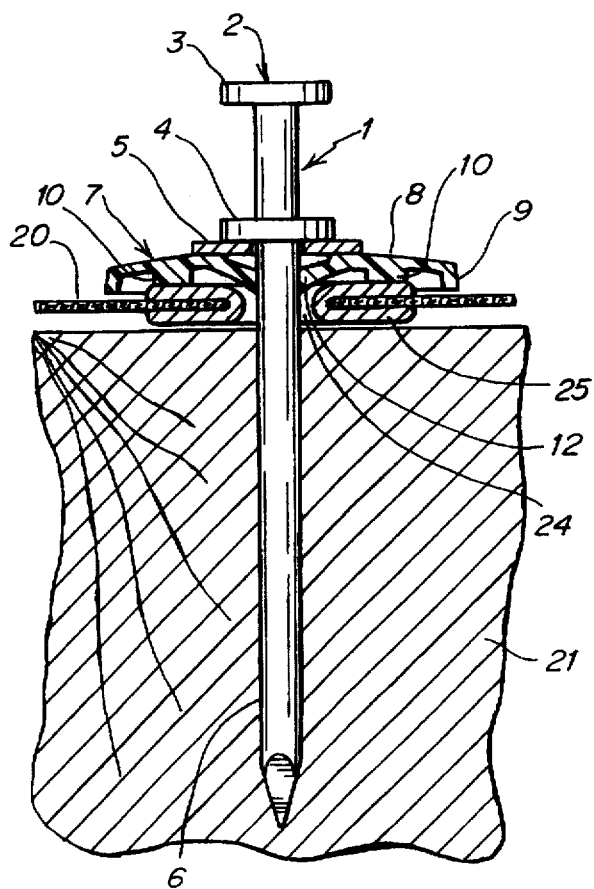
FIG. 2 is a cross-sectional elevation on an enlarged scale illustrating the present invention in use.
Figure 3:
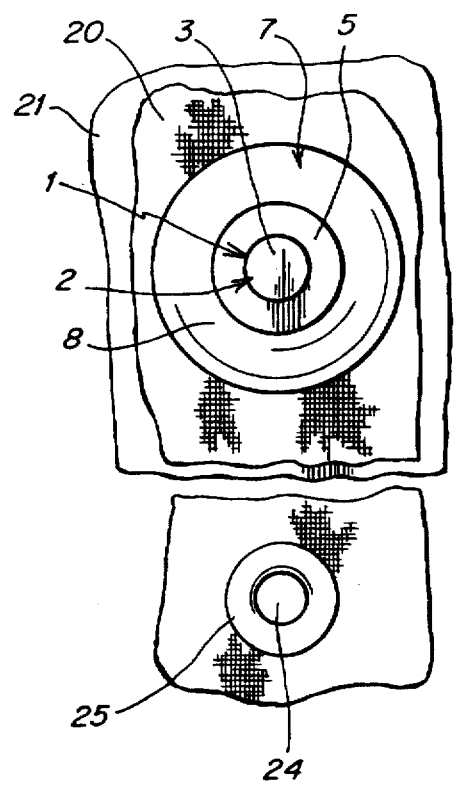
FIG. 3 is a top plan view of the assembly illustrated in FIG. 2.

As illustrated in FIG. 2, the nail 1 with its shank 6 extending through the grommet 25 into the substructure 21 secures the fabric 20 in position.

In the embodiment illustrated in FIG. 2, the fabric 20 may extend laterally to cover an opening or a hole in a roof structure if the substructure 21 is part of a beam arrangement. Other applications should be readily apparent. The securing means illustrated in FIG. 1 are used about the periphery of the fabric 20 as needed to secure the fabric in position.

To remove the fabric, an operator may lift the nail 1 vertically from the substructure 21 by grasping the upper head 3 with a pair of pliers or perhaps by engaging the upper head 3 with a claw hammer and thereby rocking it loose. If carefully done, the nail 6 will remain upright and therefore may be used again. If a claw hammer is used to lift the nail 1 upwardly from the substructure 21, the slight flexing of the claw will not likely damage the securing means because the apron 8 is plastic and will flex as the claw hammer is rocked to lift the nail 1 upwardly.

Although in this embodiment a fabric is described other suitable covers may also be secured including but not limited to plywood, plastic and metal sheets used to cover a variety of openings or objects.

Having now described my invention I claim:

1. A securing means for temporarily securing a covering to a substructure comprising a nail having an elongated member forming a shank, an upper head integral with one end of the shank of the nail and a lower head between the upper head and the other end of the shank, an apron having an outer periphery with an outer diameter in the order of at least twice the diameter of the lower head engaging said shank, and a flat washer positioned on said shank intermediate said apron and lower head.

2. A securing means as set forth in claim 1 in combination with a fabric covering having at least one grommeted hole therein and a substructure with the shank of said nail extending through said grommet into said substructure to secure said fabric between said apron and substructure.

3. A securing means as set forth in claim 1 wherein said apron is formed of plastic and comprises an annular web having a downwardly extending annular flange along its outer periphery.

4. A securing means as set forth in claim 3 wherein said web is formed with an annular fillet defining an axial opening and in frictional engagement with said shank.

5. A securing means as set forth in claim 3, wherein said lower head has upper and lower sides extending from said shank, and said apron is positioned on said lower side of said lower head remote from said upper head.

6. A securing means as set forth in claim 5, wherein said apron is in frictional engagement with said shank.

* * * * *